(12) United States Patent
Sato

(10) Patent No.: US 10,777,825 B2
(45) Date of Patent: Sep. 15, 2020

(54) IN-VEHICLE FUEL CELL STACK

(71) Applicant: HONDA MOTOR CO., LTD, Minato-ku, Tokyo (JP)

(72) Inventor: Masahiko Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 346 days.

(21) Appl. No.: 15/813,275

(22) Filed: Nov. 15, 2017

(65) Prior Publication Data

US 2018/0138527 A1 May 17, 2018

(30) Foreign Application Priority Data

Nov. 17, 2016 (JP) ................. 2016-224146

(51) Int. Cl.
| | |
|---|---|
| *H01M 8/04089* | (2016.01) |
| *H01M 8/02* | (2016.01) |
| *H01M 8/241* | (2016.01) |
| *H01M 8/2484* | (2016.01) |
| *H01M 8/2475* | (2016.01) |
| *B60L 50/72* | (2019.01) |
| *H01M 8/0662* | (2016.01) |

(52) U.S. Cl.
CPC ......... *H01M 8/04089* (2013.01); *B60L 50/72* (2019.02); *H01M 8/02* (2013.01); *H01M 8/0662* (2013.01); *H01M 8/241* (2013.01); *H01M 8/2475* (2013.01); *H01M 8/2484* (2016.02); *H01M 2250/20* (2013.01); *Y02T 90/32* (2013.01)

(58) Field of Classification Search
CPC ............. H01M 8/0662; H01M 8/2475; H01M 8/2484; B60L 150/72
See application file for complete search history.

(56) References Cited

U.S. PATENT DOCUMENTS

| | | | |
|---|---|---|---|
| 2002/0157359 A1* | 10/2002 | Stenersen | .......... B01D 46/0023 55/350.1 |
| 2009/0191805 A1 | 7/2009 | Cusumano et al. | |
| 2015/0004502 A1* | 1/2015 | Ikeya | .................. H01M 8/0687 429/410 |
| 2015/0270562 A1 | 9/2015 | Naito et al. | |

FOREIGN PATENT DOCUMENTS

| | | |
|---|---|---|
| CN | 204361216 | 5/2015 |
| JP | 2004-175281 | 6/2004 |
| JP | 2004-186029 | 7/2004 |
| JP | 2015-193370 | 11/2015 |

OTHER PUBLICATIONS

Japanese Office Action for Japanese Patent Application No. 2016-224146 dated Sep. 10, 2019.
Chinese Office Action for Chinese Patent Application No. 201711132218.2 dated Jul. 6, 2020.

* cited by examiner

*Primary Examiner* — Stephan J Essex
(74) *Attorney, Agent, or Firm* — Amin, Turocy & Watson, LLP

(57) ABSTRACT

An in-vehicle fuel cell stack includes a ventilation mechanism for ventilating a stack case through a ventilation opening opened to the inside of the stack case. The ventilation mechanism includes an inlet member. An air inlet port and an inner channel are formed in the inlet member. A ventilating air is guided into the ventilation mechanism through the air inlet port. The inner channel connects the air inlet port and the ventilation opening. The inner channel includes a labyrinth channel.

17 Claims, 7 Drawing Sheets

IN-VEHICLE FUEL CELL STACK

CROSS-REFERENCE TO RELATED APPLICATION

This application is based upon and claims the benefit of priority from Japanese Patent Application No. 2016-224146 filed on Nov. 17, 2016, the contents of which are incorporated herein by reference.

BACKGROUND OF THE INVENTION

Field of the Invention

The present invention relates to an in-vehicle fuel cell stack including a stack body formed by stacking a plurality of power generation cells in a stacking case, and a ventilation mechanism for ventilating the stack case.

Description of the Related Art

For example, a solid polymer electrolyte fuel cell includes a membrane electrode assembly (MEA). An anode is provided on one surface of an electrolyte membrane, and a cathode is provided on the other surface of the electrolyte membrane to form the membrane electrode assembly. The electrolyte membrane is a polymer ion exchange membrane. The membrane electrode assembly is sandwiched between separators to form a power generation cell (unit cell). Normally, a predetermined number of power generation cells are stacked together to form an in-vehicle fuel cell stack, e.g., mounted in a fuel cell vehicle.

The in-vehicle fuel cell stack adopts the structure where a stack body formed by stacking a predetermined number of power generation cells together is placed in a stack case. In the structure, leakage of hydrogen gas through a gap, etc. of a stack body may occur in the stack case. Therefore, in the case where the stack body is placed in the stack body, the leaked hydrogen gas is accumulated in the stack case. In an attempt to address the problem, it is suggested to provide a ventilation mechanism to ventilate the stack case by guiding the air into the stack case from the outside so that the hydrogen gas concentration in the stack case is not more than a certain concentration (e.g., see Japanese Laid-Open Patent Publication No. 2004-186029).

SUMMARY OF THE INVENTION

The ventilation mechanism has an air inlet port and a channel that connect the inside and the outside of the stack case. In the structure, there is a possibility that foreign matters other than the air such as water, dust, mud, pebbles may enter the stack case undesirably from the outside, through the air inlet port and the channel.

The present invention has been made taking the above problems into consideration, and an object of the present invention is to provide an in-vehicle fuel cell stack can suppress entry of foreign matters other than the air into the stack case as much as possible.

In order to achieve the above object, in the present invention, an in-vehicle fuel cell stack includes a stack body and a stack case containing the stack body. The stack body is formed by stacking a plurality of power generation cells for generating electrical energy by electrochemical reactions of a fuel gas and an oxygen-containing gas. The in-vehicle fuel cell stack includes a ventilation mechanism configured to ventilate the stack case through a ventilation opening opened to the inside of the stack case. The ventilation mechanism includes an inlet member having an air inlet port configured to guide a ventilating air from the outside and an inner channel configured to connect the air inlet port and the ventilation opening. The inner channel includes a labyrinth channel.

Preferably, the ventilation opening is provided at a lower position of the stack case.

Preferably, the ventilation mechanism includes a tube member, and one end of the tube member is connected to the ventilation opening and the other end of the tube member is connected to the inlet member.

Preferably, the inlet member is provided in an undercover of a vehicle to which the in-vehicle fuel cell stack is mounted, and the air inlet port is opened to a lower surface of the vehicle.

Preferably, the labyrinth channel is formed in a cylindrical shape along a direction of gravity.

Preferably, the channel cross section area of the labyrinth channel is equal to or more than the channel cross sectional area of the tube member over the entire channel length.

Preferably, the air inlet port is opened downward, the inlet member includes at least one barrier wall plate forming the labyrinth channel, and an inner circumferential portion or an outer circumferential portion of the at least one barrier wall plate is inclined or protrudes downward.

Preferably, the air inlet port is opened downward, the inlet member includes a plurality of barrier walls forming the labyrinth channel, and the plurality of barrier walls include a first barrier wall facing the air inlet port and positioned above the air inlet port and a second barrier wall provided above the first barrier wall and having an opening opened at a position facing the first barrier wall.

Preferably, the air inlet port is opened downward, a plurality of drain holes are formed in the inlet member, around the air inlet port, and the drain holes connect the inner channel and the outside of the inlet member.

Preferably, a mesh member is provided at the air inlet port.

The in-vehicle fuel cell stack of the present invention includes the ventilation mechanism for ventilating the stack case, and the inlet member of the ventilation mechanism includes the labyrinth channel. In the structure, it is possible to ventilate the stack case suitably, and keep the hydrogen gas concentration in the stack case being not more than a certain concentration. Further, during driving of the fuel cell vehicle, even if the foreign matters such as water, dust, mud, pebbles, etc. are scattered toward the inlet member, entry of the foreign materials toward the ventilation opening is prevented by the labyrinth channel. Therefore, it is possible to suppress entry of the foreign matters into the stack case through the ventilation opening as much as possible.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of an in-vehicle fuel cell stack according to the present invention will be described with reference to the accompanying drawings.

Figure 1:
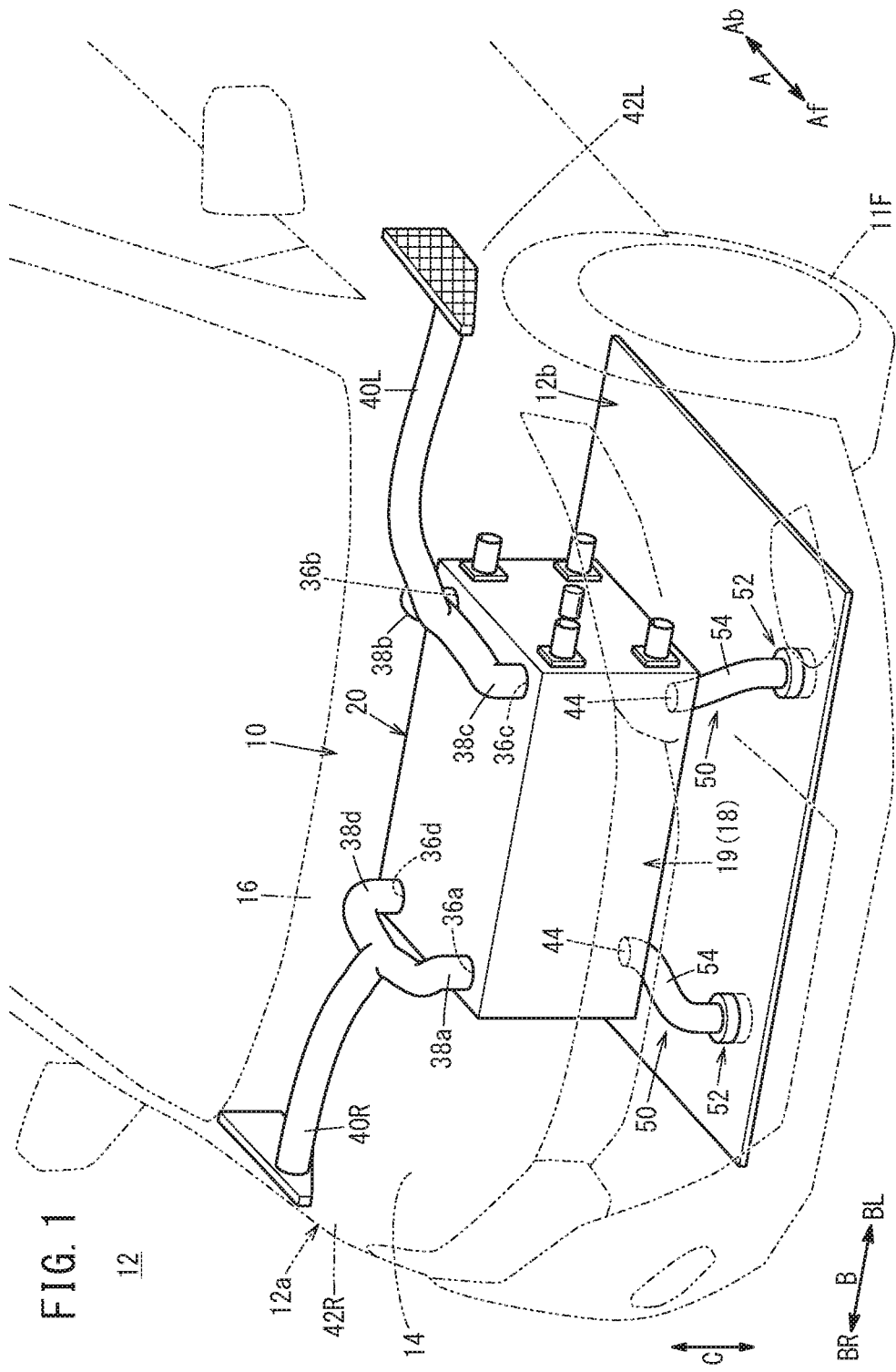
FIG. 1 is a perspective view schematically showing a front portion of a fuel cell vehicle equipped with an in-vehicle fuel cell stack according to an embodiment of the present invention.

As shown in FIG. 1, the in-vehicle fuel cell stack 10 (hereafter referred to as the "fuel cell stack 10") according to the embodiment of the present invention is mounted in a fuel cell vehicle 12 such as a fuel cell electric vehicle. The fuel cell vehicle 12 includes a vehicle body 12a including front wheels 11F and rear wheels (not shown).

A front box (motor room) 14 in which the fuel cell stack 10 is mounted is formed on the front wheels 11F side of the vehicle body 12a, ahead of the dashboard 16. It should be noted that the fuel cell stack 10 may not be mounted in the front box 14. For example, the fuel cell stack 10 may be mounted under the floor, or under the trunk lid.

Figure 2:
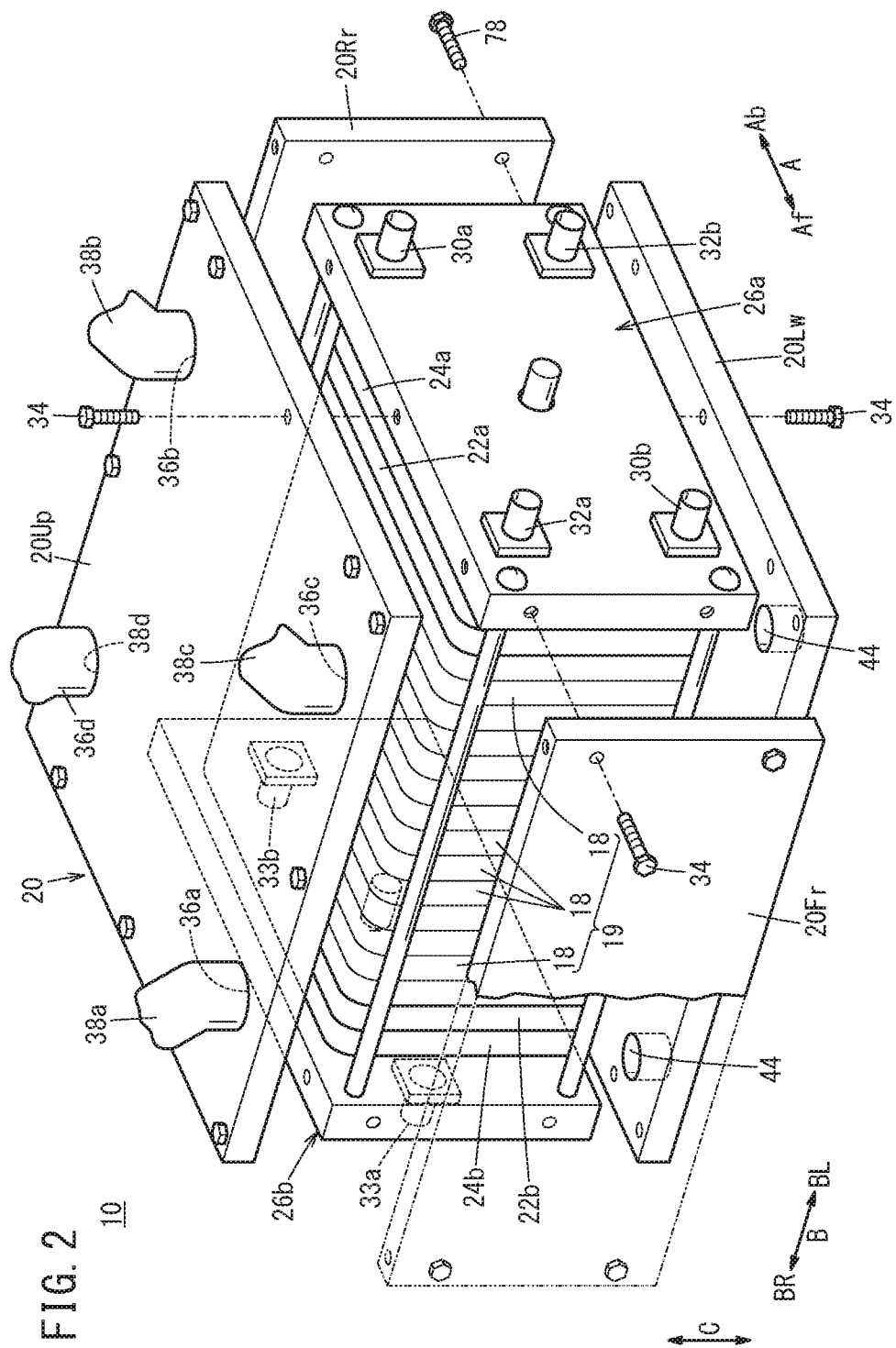
FIG. 2 is an exploded perspective view showing the fuel cell stack.

As shown in FIG. 2, the fuel cell stack 10 includes a stack body 19 formed by stacking a plurality of power generation cells 18, and a stack case 20 containing the stack body 19. A plurality of power generation cells 18 are stacked together in a horizontal direction (vehicle width direction) indicated by an arrow B with power generation surfaces of the power generation cells 18 being oriented upright. At one end of the power generation cells 18 in the stacking direction, a first terminal plate 22a is provided. A first insulating plate 24a is provided outside the first terminal plate 22a, and a first end plate 26a is provided outside the first insulating plate 24a.

At the other end of the power generation cells 18 in the stacking direction, a second terminal plate 22b is provided. A second insulating plate 24b is provided outside the second terminal plate 22b, and a second end plate 26b is provided outside the second insulating plate 24b. At both ends of the fuel cell stack 10 in the vehicle width direction, the first end plate 26a and the second end plate 26b are provided.

It should be noted that the first end plate 26a forms one wall of a rectangular parallelepiped stack case 20. The second end plate 26b forms a wall of the stack case 20 opposite to the first end plate 26a. The fuel cell stack 10 is fixed to a vehicle frame through mount members (not shown) provided for the first end plate 26a and the second end plate 26b.

Each of the power generation cells 18 includes a membrane electrode assembly (MEA) and metal or carbon separators stacked on both sides of the membrane electrode assembly. The membrane electrode assembly includes a pair of electrodes (anode and cathode) and an electrolyte membrane such as a solid polymer electrolyte membrane interposed between the electrodes. It should be noted that each of the power generation cells 18 may be formed by stacking two membrane electrode assemblies and three separators alternately.

At one end of the power generation cells 18 in the direction indicated by the arrow A, an oxygen-containing gas supply passage, a coolant supply passage, and a fuel gas discharge passage are arranged in the vertical direction indicated by an arrow C. The oxygen-containing gas supply passage, the coolant supply passage, and the fuel gas discharge passage extend through the power generation cells 18 in the stacking direction indicated by the arrow B.

The oxygen-containing supply passage supplies an oxygen-containing gas to an oxygen-containing gas flow field formed at the cathode side of the power generation cells 18. The coolant supply passage supplies a coolant (e.g., water) to a coolant flow field formed between the adjacent power generation cells 18. The fuel gas discharge passage discharges a fuel gas (e.g., hydrogen-containing gas).

At the other end of the power generation cells 18 in the direction indicated by the arrow A, a fuel gas supply passage, a coolant discharge passage, and an oxygen-containing gas discharge passage extend through the power generation cells 18 in the direction indicated by the arrow B and are arranged in the direction indicated by the arrow C. The fuel gas supply passage supplies a fuel gas to a fuel gas flow field formed on the anode side of the power generation cells 18. The coolant discharge passage is connected to the coolant flow field and discharges the coolant. The oxygen-containing gas discharge passage is connected to the oxygen-containing gas flow field and discharges the oxygen-containing gas.

An oxygen-containing gas supply manifold 30a and an oxygen-containing gas discharge manifold 30b are provided at a pair of diagonal positions of the first end plate 26a. The oxygen-containing gas supply manifold 30a is connected to the oxygen-containing gas supply passage. The oxygen-containing gas discharge manifold 30b is connected to the oxygen-containing gas discharge passage. A fuel gas supply manifold 32a and a fuel gas discharge manifold 32b are provided at the other pair of diagonal positions of the first end plate 26a. The fuel gas supply manifold 32a is connected to the fuel gas supply passage. The fuel gas discharge manifold 32b is connected to the fuel gas discharge passage.

A coolant supply manifold 33a and a coolant discharge manifold 33b are provided for the second end plate 26b. The coolant supply manifold 33a is connected to the coolant supply passage. The coolant discharge manifold 33b is connected to the coolant discharge passage.

The stack case 20 includes a front side panel 20Fr, a rear side panel 20Rr, an upper panel 20Up, and a lower panel 20Lw. Further, the stack case 20 includes the first end plate 26a and the second end plate 26b described above. Each of the panels is fixed to the first end plate 26a and the second end plate 26b using screws 34. Further, the adjacent panels are fixed together using screws 34.

Exhaust gas openings 36a, 36b are formed at a pair of diagonal positions of the upper panel 20Up. Exhaust gas openings 36c, 36d are formed at the other pair of diagonal positions of the upper panel 20Up. The exhaust gas openings 36a, 36b connect the inside of the stack case 20 to the outside. The exhaust gas openings 36c, 36d connect the inside of the stack case 20 to the outside. The exhaust gas openings 36a, 36c are provided at both ends on the front side of the stack case 20 (in a direction indicated by an arrow Af), vertically above the fuel gas supply passage.

In FIG. 1, exhaust gas ducts 38a, 38d are connected to the exhaust gas openings 36a, 36d. The exhaust gas ducts 38a, 38d are merged together into a right exhaust duct 40R. The exit of the right exhaust duct 40R is opened to a right fender part 42R of the vehicle body 12a. The exhaust gas ducts 38b, 38c are connected to exhaust gas openings 36b, 36c. The exhaust gas ducts 38b, 38c are merged together into a left exhaust duct 40L. The exit of the left exhaust duct 40L is opened to a left fender part 42L of the vehicle body 12a.

As shown in FIG. 2, ventilation openings 44 are formed in a lower panel 20Lw which is a lower portion of the stack case 20. The ventilation openings 44 connect the inside and the outside of the stack case 20. Each of the ventilation openings 44 is a hole extending through a lower panel 20Lw in the thickness direction (vertical direction). In FIG. 2, the ventilation openings 44 are formed in the vehicle's front side of the lower panel 20Lw. It should be noted that the ventilation openings 44 may be formed in the vehicle's back side of the lower panel 20Lw, or formed in a central part of the lower panel 20Lw in the driving direction of the vehicle.

In FIG. 2, one ventilation opening 44 is provided at each of one side (left side) and the other side (right side) in the vehicle width direction. It should be noted that the ventilation opening 44 may be provided at a central part in the vehicle width direction. Three or more ventilation openings 44 may be provided. Alternatively, only one ventilation opening 44 may be provided.

As shown in FIG. 1, the fuel cell stack 10 further includes ventilation mechanisms 50 for ventilating the stack case 20. The ventilating mechanisms 50 include the ventilation openings 44 opened to the inside of the stack case 20. As described above, the ventilation openings 44 are provided in the lower panel 20Lw, which constitutes the lower part of the stack case 20. The ventilation mechanisms 50 ventilate the stack case 20 through the ventilation openings 44.

In the embodiment of the present invention, each of the ventilating mechanisms 50 includes an inlet member 52 as part of an inlet section for guiding the air from the outside, and a tube member 54 connecting the stack case 20 and the inlet member 52. In the fuel cell stack 10, preferably, a plurality of ventilation mechanisms 50 are provided. In FIG. 1, two ventilation mechanisms 50 are separated in the vehicle width direction (left-right direction) indicated by an arrow B. The plurality of ventilation mechanisms 50 may be separated in the driving direction of the vehicle. Only one ventilation mechanism 50 may be provided.

In FIG. 1, the inlet members 52 are provided ahead of the stack case 20 in a driving direction of the vehicle (in a direction indicated by an arrow Af). The inlet members 52 may be provided behind the stack case 20 in the driving direction of the vehicle indicated by an arrow Ab. Alternatively, the inlet members 52 may be provided at positions overlapped with the stack case 20 in the driving direction of the vehicle.

As shown in FIG. 1, the inlet members 52 are attached to an undercover 12b that is disposed below the stack case 20. The undercover 12b is a member covering a lower portion of the front box 14 and is fixed to a vehicle body frame (not shown) of the fuel cell vehicle 12. The inlet member 52 is disposed below the lower surface of the stack case 20.

The inlet members 52 penetrate the undercover 12b and are fixed. Therefore, the lower part (lower surface) of each of the inlet members 52 is exposed to the outside from the lower surface of the undercover 12b, and faces the road surface on which the fuel cell vehicle 12 travels. The upper surface of each of the inlet members 52 is exposed to the inside of the front box 14.

Figure 3:
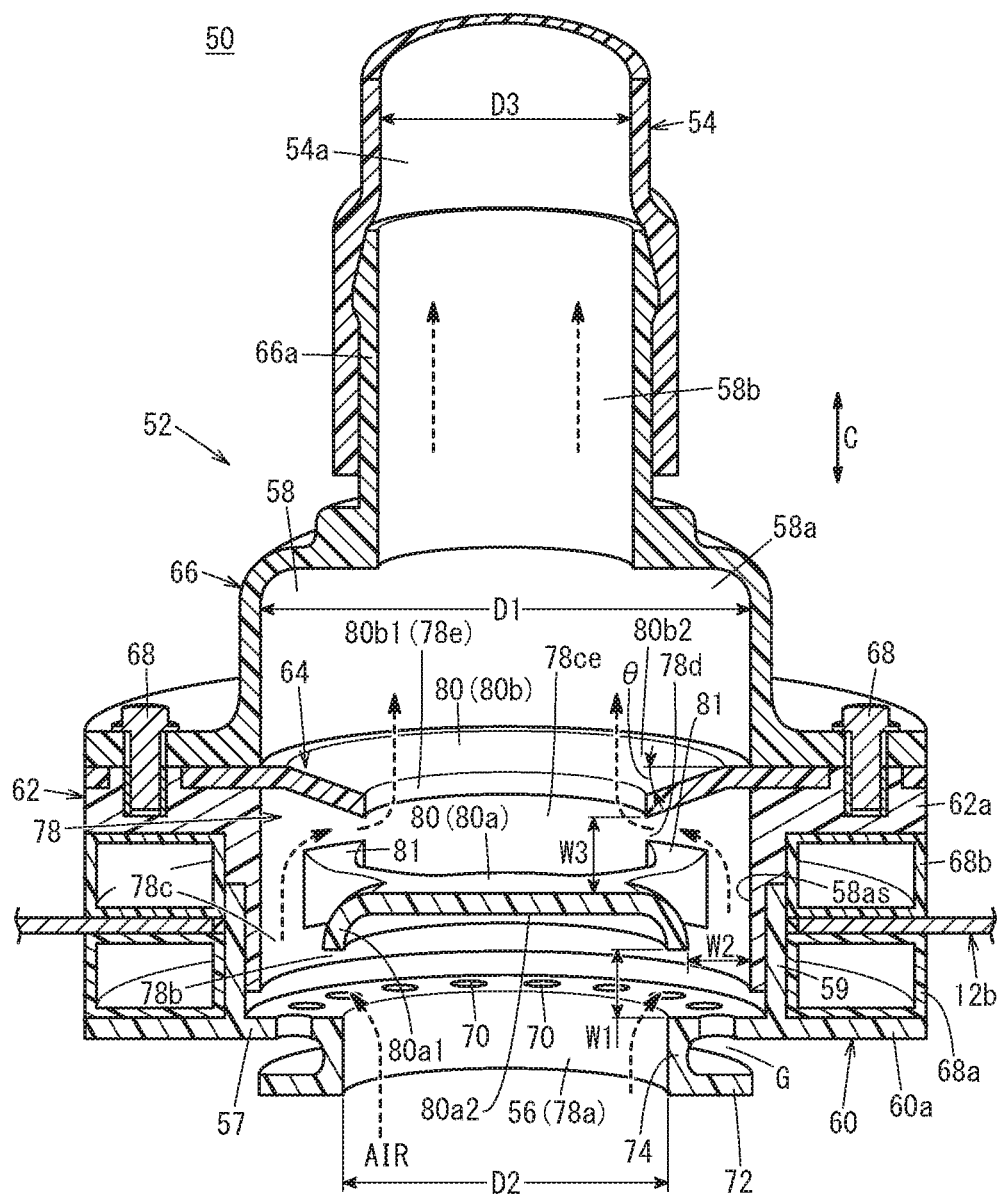
FIG. 3 is a perspective cross sectional view showing an inlet member.

As shown in FIG. 3, an air inlet port 56 and an inner channel 58 are formed in the inlet member 52. Specifically, the inlet member 52 includes an inlet port forming member 60, a first channel forming member 62, a second channel forming member 64, a third channel forming member 66, and two seal members 68a, 68b. The air inlet port 56 is formed in the inlet port forming member 60. The inner channel 58 is formed by the inlet port forming member 60, the first channel forming member 62, the second channel forming member 64, and the third channel forming member 66.

The inlet port forming member 60, the first channel forming member 62, the second channel forming member 64, and the third channel forming member 66 are stacked together in the vertical direction and connected together. The first channel forming member 62 is a hollow member and is connected to an upper part of the inlet port forming member 60. The second channel forming member 64 is a plate member is overlapped with an upper part of the first channel forming member 62, and is held between the first channel forming member 62 and the third channel forming member 66.

The third channel forming member 66 is a hollow member and is overlapped with an upper part of the second channel forming member 64. The third channel forming member 66 is fixed to the first channel forming member 62 with a plurality of screws 68. Each of the two seal members 68a, 68b has a hollow ring shape in cross section. The two seal members 68a, 68b are held between a flange 60a of the inlet port forming member 60 and a flange 62a of the first channel forming member 62. The undercover 12b is sandwiched between the two seal members 68a, 68b.

The air inlet port 56 is a channel for guiding the ventilation air from the outside. In the embodiment of the present invention, the air inlet port 56 is a circular opening. The air inlet port 56 may be a non-circular opening, e.g., an oval opening, a rectangular opening, etc. The inlet member 52 is disposed with the air inlet port 56 oriented downward. Therefore, the air inlet port 56 faces the road surface on which the fuel cell vehicle 12 travels.

A plurality of drain holes 70 connecting the inner channel 58 and the outside of the inlet member 52 are formed around the air inlet port 56. The plurality of drain holes 70 penetrates in the vertical direction a wall 57 forming the bottom of a chamber 58a. The plurality of drain holes 70 are formed in the inlet port forming member 60. The plurality of drain holes 70 are opened at the upper surface and the lower surface of the wall 57.

The inlet port forming member 60 has a ring-shaped extension 72, below (right below) the plurality of drain holes 70. The extension 72 faces the plurality of drain holes 70 via a gap G. The extension 72 protrudes outward in the radial direction from the lower portion of the cylindrical wall 74 which surrounds the air inlet port 56.

The inner channel 58 includes a cylindrical chamber 58a adjacent to the air inlet port 56, and a connection channel 58b for supplying the air which has passed through the chamber 58a, to the tube member 54. In FIG. 3, the chamber 58a is positioned vertically above (right above) the air inlet port 56. The chamber 58a is formed by the upper part of the inlet port forming member 60, and the lower parts of the first flow channel forming member 62 and the third channel forming member 66.

The inner diameter D1 of the chamber 58a is larger than the inner diameter D2 of the air inlet port 56. The inner diameter D1 of the chamber 58a is larger than the inner diameter D3 of the tube member 54. The chamber 58a functions as water storage (buffer) when water infiltrates from the air inlet port 56. Preferably, the height of the chamber 58a is, for example, larger than the inner diameter D2 of the air inlet port 56. It should be noted that the height of the chamber 58a may be not more than the inner diameter of the air inlet port 56.

The connection channel 58b connects the chamber 58a and the channel 54a in the tube member 54. The inner diameter of the connection channel 58b is approximately equal to the inner diameter D3 of the tube member 54. The connection channel 58b is positioned vertically above (right above) the chamber 58a. The connection channel 58b is formed in a connection cylinder 66a provided above the third channel forming member 66. The air inlet port 56, the chamber 58a, and the connection channel 58b are provided in the vertical direction coaxially.

The inner channel 58 includes a labyrinth channel 78 in the chamber 58a. For example, the labyrinth channel 78 herein means a channel extending through the cylindrical channel in a serpentine (meandering) pattern. However, the serpentine pattern is not limited to a particular pattern. The labyrinth channel 78 is formed in a cylindrical shape along the gravity direction (vertical direction). The inlet member 52 includes at least one barrier wall plate 80 (barrier part) forming the labyrinth channel 78. In the embodiment of the present invention, the inlet member 52 includes a plurality of barrier wall plates 80. Specifically, the plurality of barrier wall plates 80 include a first barrier wall plate 80a (first barrier wall) facing the air inlet port 56 and disposed above (right above) the air inlet port 56, and a second barrier wall plate 80b (second barrier wall) having an opening 80b1 that is opened at a position facing the first barrier wall plate 80a above (right above) the first barrier wall plate 80a.

The first barrier wall plate 80a is formed integrally with the first channel forming member 62 through a plurality of support parts 81. In the structure, the outer circumferential portion of the first barrier wall plate 80a is spaced inward from the inner circumferential surface 58as forming the chamber 58a. The plurality of support parts 81 are separated at certain intervals in the circumferential direction. The first barrier wall plate 80a has a circular disk shape.

The outer diameter of the first barrier wall plate 80a is larger than the inner diameter of the air inlet port 56. The outer circumferential portion of the first barrier wall plate 80a includes a ring shaped protrusion 80a1. The ring shaped protrusion 80a1 is curved downward and protrudes from the first barrier wall plate 80a. The first barrier wall plate 80a faces the air inlet port 56 and includes a recess 80a2 that is recessed in a direction away from the air inlet port 56. The first barrier wall plate 80a facing the air inlet port 56 is not limited to a plate shape like the first barrier wall plate 80a. The first barrier wall plate 80a may be block-shaped having a larger thickness.

The second barrier wall plate 80b forms an inner circumferential portion of the second channel forming member 64. The second barrier wall plate 80b protrudes inward from the inner circumferential surface 58as forming the chamber 58a. The inner diameter of the opening 80b1 formed in the second barrier wall plate 80b is smaller than the outer diameter of the first barrier wall plate 80a. The center of the first barrier wall plate 80a is in alignment with the center of the opening 80b1 in the vertical direction. Therefore, as viewed from below in the vertical direction, the first barrier wall plate 80a covers the entire opening 80b1.

The inner circumferential portion of the second barrier wall plate 80b includes an inclined portion 80b2 inclined downward toward the center of the opening 80b1. The inclined portion 80b2 may have any of straight inclination and curved inclination. The second barrier wall having the opening 80b1 is not limited to a plate shape like the second barrier wall plate 80b. The second barrier wall may be block-shaped having a larger thickness.

The inlet member 52 has the labyrinth channel 78 including first to fifth constricted channels 78a to 78e. The first constricted channel 78a is formed by the air inlet port 56. The second constricted channel 78b is a ring shaped channel formed between the outer circumferential portion (ring shaped protrusion 80a1) of the first barrier wall plate 80a and an upper surface of the wall 57, which constitutes the bottom of the chamber 58a, and has a channel width W1 in the vertical direction.

The third constricted channel 78c is a channel formed between the outer end of the first barrier wall plate 80a and the inner circumferential surface 58as, which constitutes the chamber 58a, and has a channel width W2 in the horizontal direction. The third constricted channel 78c is formed by a plurality of channel elements 78ce divided in a circumferential direction by the plurality of support parts 81.

The fourth constricted channel 78d is a ring shaped channel formed between the outer circumferential portion of the first barrier wall plate 80a and the inner end of the second barrier wall plate 80b, and has a channel width W3 in the vertical direction. The fifth constricted channel 78e is a channel formed by the opening 80b1 of the second barrier wall plate 80b.

Each of the first to fifth constricted channels 78a to 78e has a channel cross sectional area which is equal to or more than the channel cross sectional area of the tube member 54. Therefore, the channel cross sectional area of the labyrinth channel 78 is equal to or more than the channel cross sectional area of the tube member 54 over the entire channel length. As for the third constricted channel 78c, the total of the channel cross sectional areas of the plurality of channel elements 78ce is the channel cross sectional area of the third constricted channel 78c. Preferably, for example, each of the channel cross sectional areas of the first to fifth constricted channels 78a to 78e is 100% to 170% of the channel cross sectional area of the tube member 54.

In FIG. 1, the tube member 54 is provided inside the front box 14. As the tube member 54, for example, a hose (flexible tube) is used. One end of the tube member 54 is connected to the ventilation opening 44 in an air-tight and liquid-tight manner. The other end of the tube member 54 is connected to the inlet member 52 in an air-tight and liquid-tight manner. The other end of the tube member 54 is positioned below the one end of the tube member 54.

Operation of the fuel cell stack 10 having the above structure will be described below.

During operation of the fuel cell stack 10, the fuel gas is supplied from the fuel gas supply manifold 32a of the first end plate 26a to the fuel gas supply passage. The fuel gas flows through the fuel gas supply passage and flows into the fuel gas flow field in the power generation cell 18. Thus, the hydrogen gas is supplied to the anode of the membrane electrode assembly.

In the meanwhile, the oxygen-containing gas is supplied from the oxygen-containing gas supply manifold 30a of the first end plate 26a to the oxygen-containing gas supply passage. The oxygen-containing gas flows into the oxygen-containing gas flow field in the power generation cell 18 through the oxygen-containing gas supply passage. Thus, the oxygen-containing gas is supplied to the cathode of the membrane electrode assembly.

Thus, in the membrane electrode assembly of the power generation cell 18, the hydrogen gas supplied to the anode and the air supplied to the cathode are consumed in electrochemical reactions in the electrode catalyst layers to generate electrical energy.

The fuel gas is discharged to the fuel gas discharge manifold 32b of the first end plate 26a through the fuel gas discharge passage. The oxygen-containing gas is discharged into the oxygen-containing gas discharge manifold 30b of the first end plate 26a through the oxygen-containing gas discharge passage.

The coolant is supplied from the coolant supply manifold 33a of the second end plate 26b to the coolant supply passage. The coolant flows into the coolant flow field between the adjacent power generation cells 18. After cooling the membrane electrode assembly, the coolant flows through the coolant discharge passage and is discharged into the coolant discharge manifold 33b.

In the embodiment of the present invention, the ventilating mechanisms 50 are provided to ventilate the stack case 20 through the ventilation openings 44 opened to the inside of the stack case 20. As shown in FIG. 3, each of the ventilating mechanisms 50 includes the inlet member 52 having the air inlet port 56 for guiding the ventilation air from the outside, and the inner channel 58 connecting the air inlet port 56 and the ventilation opening 44.

Thus, the air from the air inlet port 56 flows through the inner channel 58 and is supplied toward the stack case 20. In the structure, the stack case 20 is ventilated suitably, and the hydrogen gas concentration in the stack case 20 can be kept being not more than a certain concentration. In this case, the air supplied from the air inlet port 56 flows outward below the first barrier wall plate 80a, and thereafter, flows upward between the outer circumferential portion of the first barrier wall plate 80a and the inner circumferential surface 58as of the chamber 58a. Further, the air flows inward between the first barrier wall plate 80a and the second barrier wall plate 80b, and thereafter, flows upward through the opening 80b1 of the second barrier wall plate 80b and flows into the tube member 54.

The internal channel 58 includes the labyrinth channel 78. In the structure, even if foreign materials such as water, dust, mud, pebbles, etc. are scattered toward the inlet member 52, e.g., during driving of the fuel cell vehicle, the movement of the foreign matters toward the ventilation opening 44 is suppressed by the labyrinth channel 78. Therefore, it is possible to suppress entry of the foreign matters into the stack case 20 through the ventilation opening 44 as much as possible.

In the embodiment of the present invention, the ventilation mechanism 50 includes the tube member 54. One end of the tube member 54 is connected to the ventilation opening 44 and the other end of the tube member 54 is connected to the inlet member 52. Therefore, it is possible to improve the degree of freedom in the layout of the inlet member 52.

In the embodiment of the present invention, the inlet member 52 is provided in the undercover 12b of the vehicle equipped with the fuel cell stack 10. The air inlet port 56 is opened to the lower surface of the vehicle (lower surface of the vehicle body 12a). Therefore, the external air can be guided into the air inlet port 56 and it is possible prevent leakage of the hydrogen gas into the space (e.g., the front box 14, etc.) where the fuel cell stack 10 is provided.

In the embodiment of the present invention, the channel cross sectional area of the labyrinth channel 78 is, over the entire channel length of the labyrinth channel 78, equal to or more than the channel cross sectional area of the tube member 54. Specifically, each of the first to fifth constricted channels 78a to 78e has a cross sectional are which is equal to or more than the channel cross sectional area of tube member 54. Therefore, the air can smoothly flow from the air inlet port 56 toward the tube member 54 suitably. Thus, it is possible to prevent the decrease in the ventilation capability due to the provision of the labyrinth channel 78.

In the embodiment of the present invention, the inlet member 52 has at least one barrier wall plate 80 constituting the labyrinth channel 78. The inner circumferential portion or the outer circumferential portion of the at least one barrier wall plate 80 (outer circumferential portion of the first barrier wall plate 80a, the inner circumferential portion of the second barrier wall plate 80b) is inclined or protrudes downward. Since the barrier wall plate 80 is inclined or protrudes downward, even in the case where the water enters upward beyond the barrier wall plate 80, the water can be discharged downward smoothly by gravity. In particular, the second barrier wall plate 80b includes the inclined portion 80b2. The angle θ of the inclined portion 80b2 (angle relative to the surface which is perpendicular to the axis of the inlet member 52) is determined such that water is not retained even at the inclination requirement of the vehicle (about 20°). Therefore, it is possible to prevent damage caused by, for example, the water retained and frozen in the second barrier wall plate 80b.

In the embodiment of the present invention, the air inlet port 56 is opened downward and the inlet member 52 includes a plurality of barrier wall plates 80 constituting the labyrinth channel 78. Further, the plurality of barrier wall plates 80 include the first barrier wall plate 80a facing the air inlet port 56 and disposed above the air inlet port 56, and a second barrier wall plate 80b having an opening 80b1 opened at a position facing the first barrier wall plate 80a above the first barrier wall plate 80a.

Figure 4:
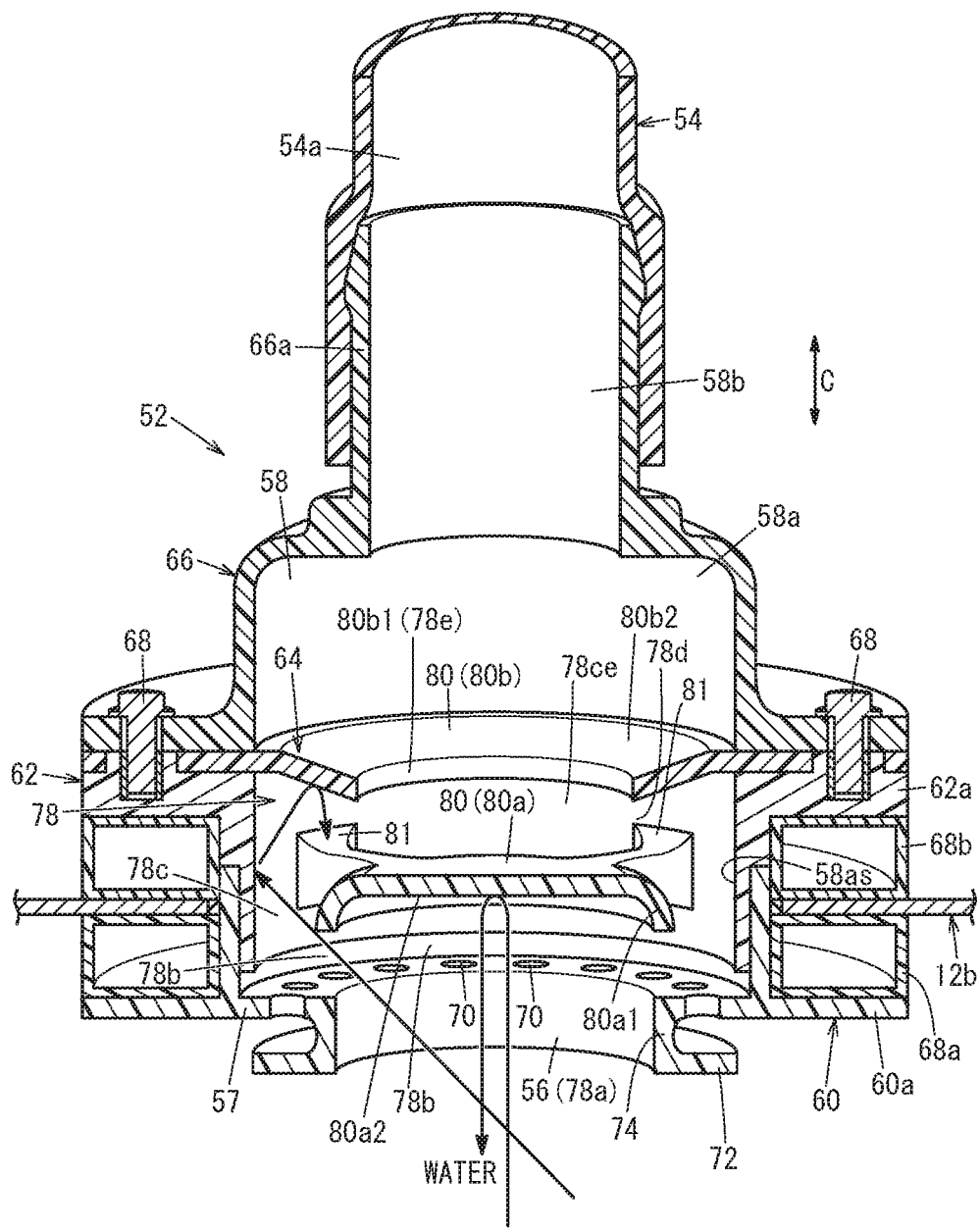
FIG. 4 is a view showing operation of the inlet member when the quantity of water is small.

Therefore, when the quantity of water is small, i.e., during driving on a rainy day, as shown in FIG. 4, water scattered in a substantially vertical direction from the air inlet port 56 toward the chamber 58a is blocked by the first barrier wall plate 80a and thus cannot enter into the deeper side. Water scattered in an oblique direction from the air inlet port 56 toward the chamber 58a may pass between the inner circumferential surface 58as of the chamber 58a and the first barrier wall plate 80a. However, since the water is blocked by the second barrier wall plate 80b, infiltration of the water toward the deeper side beyond the second barrier wall plate 80b is prevented. Therefore, it is possible to suitably suppress infiltration of the water toward the deeper side (toward the tube member 54). Further, since the ring shaped protrusion 80a1 protruding downward is provided in the outer circumferential portion of the first barrier wall plate 80a, upward infiltration of the water beyond the first barrier wall plate 80a can be prevented easily.

Figure 5:
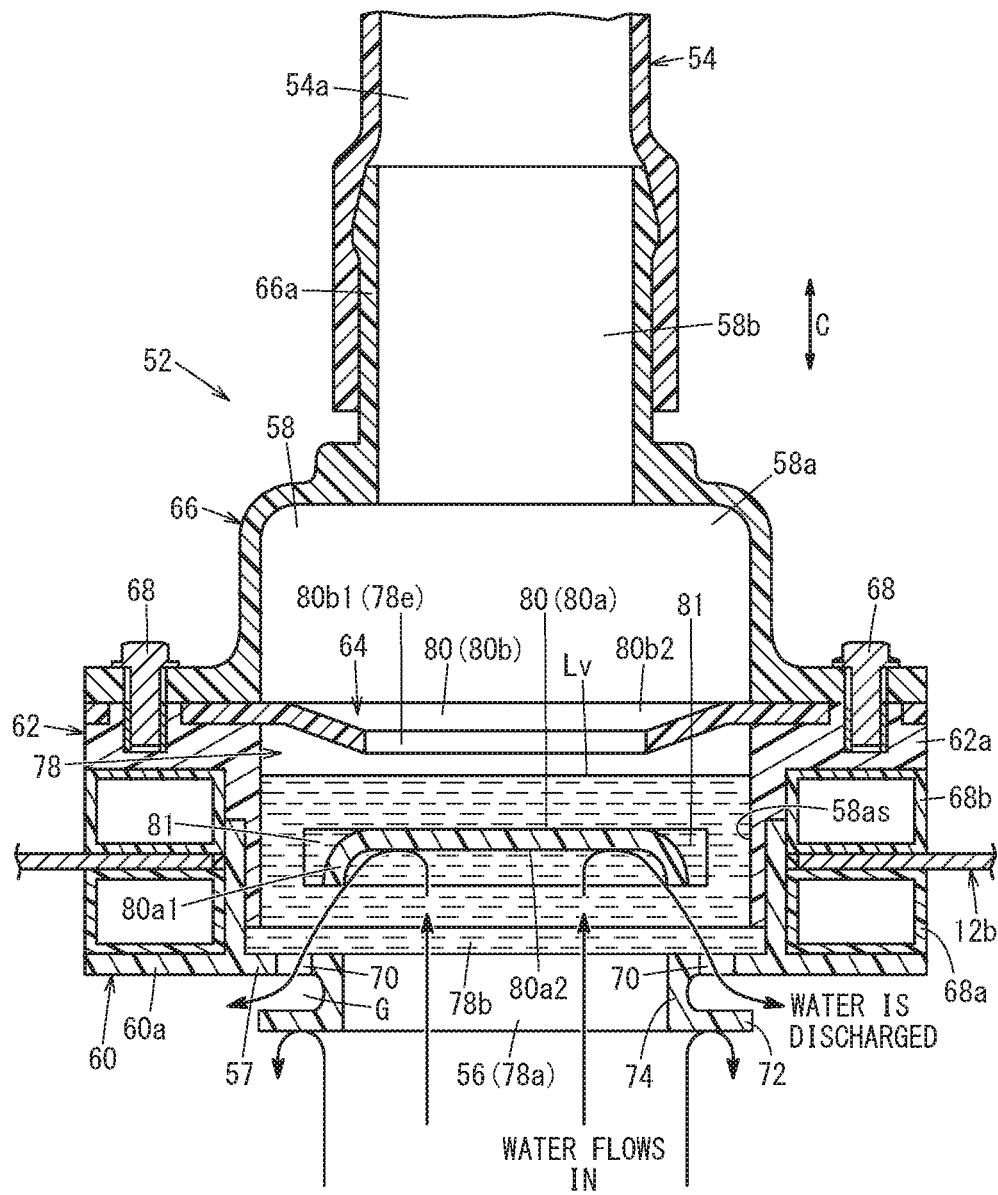
FIG. 5 is a view showing operation of the inlet member when the quantity of water is large.

In the embodiment of the present invention, the plurality of drain holes 70 connecting the inner channel 58 and the outside of the inlet member 52 are provided in the inlet member 52 around the air inlet port 56. In the structure, when the quantity of water is large, i.e., during car washing at high pressure, since the water is discharged from the chamber 58a through the drain holes 70 as shown in FIG. 5, infiltration of water toward the deeper side (toward the tube member 54) is suppressed. That is, in the state where the quantity of inflow water V1 is larger than the quantity of outflow water V2 (V1>V2), water is retained in the chamber 58a, and the water level (height of the water level Lv) is increased. When the water level is increased, the quantity of outflow water flowing out of the drain holes 70 is increased as well. Therefore, the quantity of outflow water V2 is increased, and the balance of the water quantity is achieved at the water level where the quantity of inflow water V1 becomes equal to the quantity of outflow water V2 (V1=V2).

Accordingly, it is possible to suppress excessive increase in the water level in the inlet member 52 (inner channel 58).

The extension 72 is provided vertically below the drain hole 70. Therefore, the water scattered upward from a position below drain holes 70 rebounds off the extension 72. Accordingly, infiltration of the water into the chamber 58 through the drain holes 70 is prevented effectively.

Figure 6:
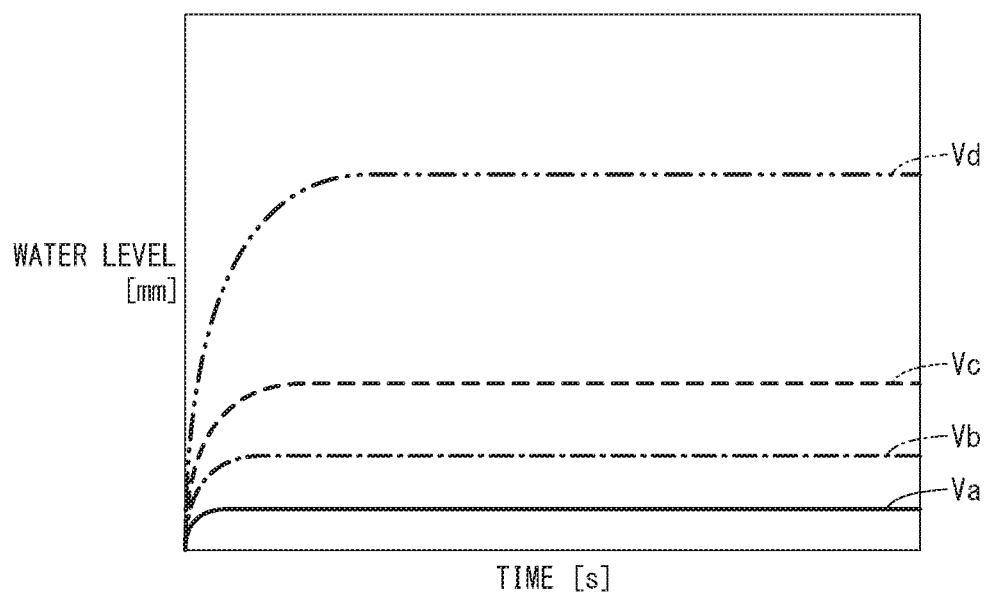
FIG. 6 is a graph of a water level in the inlet member against time for various quantities of water.

FIG. 6 shows a test result confirming the effect (water level adjusting function) of the drain holes 70. The relationship among the quantities of inflow water Va to Vd is Va<Vb<Vc<Vd. As shown in FIG. 6, in the initial stage, the water level in the chamber 58a is increased in any of the water quantities. However, thereafter, the water level is balanced regardless of the quantity of inflow water.

Figure 7:
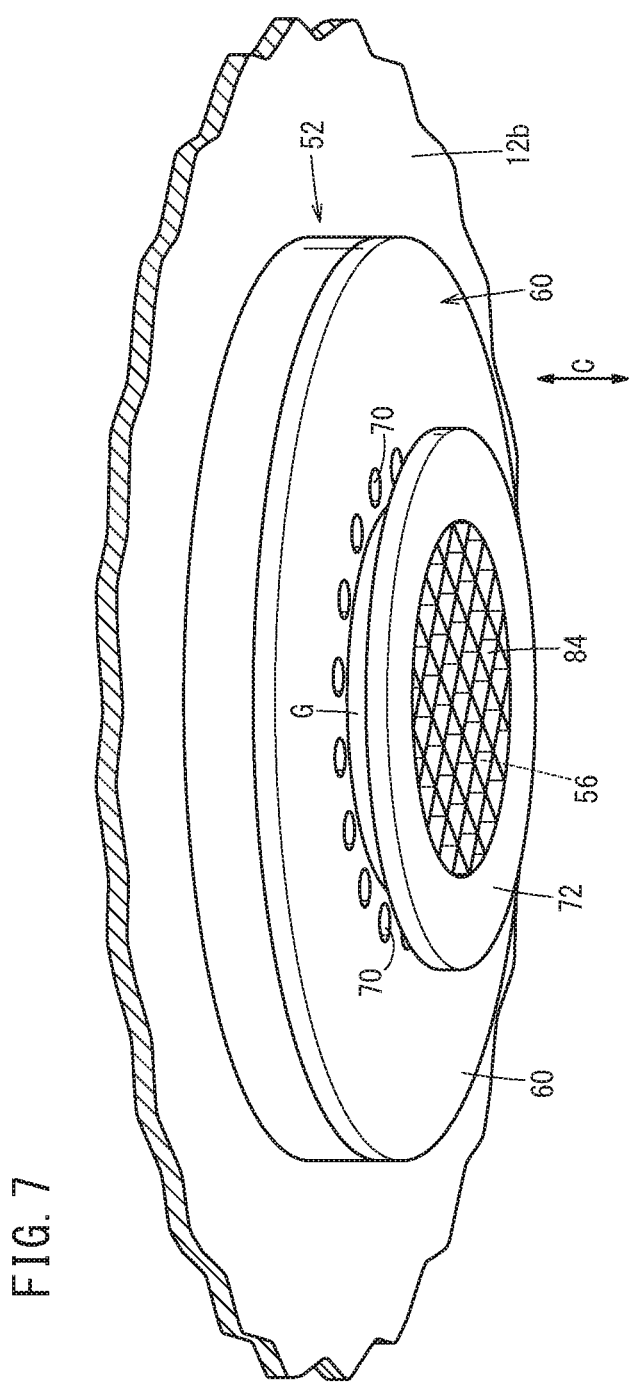
FIG. 7 is a perspective view showing the structure where a mesh member is provided at an air inlet, as viewed from below.

As shown in FIG. 7, a mesh member 84 may be provided at the air inlet port 56. The mesh member 84 is provided to cover the air inlet port 56. For example, the mesh member 84 is formed integrally with the inlet port forming member 60. The mesh member 84 may be a component fixed to the inlet port forming member 60.

In the case where the mesh member 84 of this type is provided, even if foreign matters in the solid state such as pebbles are scattered toward the air inlet port 56, the foreign matters in the solid state collide with the mesh member 84. Therefore, the entry of foreign matters such as pebbles into the air inlet port 56 is suppressed suitably.

In the above example, the inlet member 52 is connected to the stack case 20 through the tube member 54 and provided in the undercover 12b. However, the inlet member 52 may be provided at another position. For example, the inlet member 52 may be provided in the lower panel 20Lw of the stack case 20. In this case, the tube member 54 is omitted. For example, the connection cylinder 66a is inserted into and fixed to the ventilation opening 44. The circumferential wall 59 between the two flanges 60a, 62a in the inlet member 52 may be inserted into the ventilation opening 44, and the lower panel 20Lw may be sandwiched between the two seal members 68a, 68b.

The present invention is not limited to the above described embodiments. Various modifications can be made without deviating from the gist of the present invention.

What is claimed is:

1. An in-vehicle fuel cell stack including a stack body and a stack case containing the stack body, the stack body being formed by stacking a plurality of power generation cells for generating electrical energy by electrochemical reactions of a fuel gas and an oxygen-containing gas, the in-vehicle fuel cell stack comprising
a ventilation mechanism configured to ventilate the stack case through a ventilation opening opened to inside of the stack case,
wherein the ventilation mechanism includes an inlet member having an air inlet port configured to guide a ventilating air from outside and an inner channel configured to connect the air inlet port and the ventilation opening; and
the inner channel includes a labyrinth channel,
the air inlet port is opened downward;
the inlet member includes a plurality of barrier walls forming the labyrinth channel;
the plurality of barrier walls include a first barrier wall facing the air inlet port and positioned above the air inlet port and a second barrier wall provided above the first barrier wall and having an opening opened at a position facing the first barrier wall;
the second barrier wall is inclined downward and toward a center of the opening such that an inner circumferential portion of the second barrier wall is closer to the air inlet port than an outer circumferential portion of the second barrier wall.

2. The in-vehicle fuel cell stack according to claim 1, wherein the ventilation opening is provided at a lower position of the stack case.

3. The in-vehicle fuel cell stack according to claim 1, comprising a plurality of ventilation mechanisms.

4. The in-vehicle fuel cell stack according to claim 1, wherein the inlet member is provided below a lower surface of the stack case.

5. The in-vehicle fuel cell stack according to claim 2, wherein the ventilation mechanism includes a tube member wherein a first end of the tube member is connected to the ventilation opening and a second end of the tube member is connected to the inlet member.

6. The in-vehicle fuel cell stack according to claim 5, wherein the second end is positioned below the first end.

7. The in-vehicle fuel cell stack according to claim 5, wherein the inlet member is provided in an undercover of a vehicle to which the in-vehicle fuel cell stack is mounted, and the air inlet port is opened to a lower surface of the vehicle.

8. The in-vehicle fuel cell stack according to claim 7, wherein the inlet member is configured to penetrate the undercover.

9. The in-vehicle fuel cell stack according to claim 1, wherein the labyrinth channel is formed in a cylindrical shape along a direction of gravity.

10. The in-vehicle fuel cell stack according to claim 1, wherein the inlet member includes a chamber having the labyrinth channel; and
the chamber is provided right above the air inlet port in a vertical direction.

11. The in-vehicle fuel cell stack according to claim 5, wherein a channel cross section area of the labyrinth channel is equal to or more than a channel cross sectional area of the tube member over an entire channel length thereof.

12. The in-vehicle fuel cell stack according to claim 1, wherein the inlet member includes a channel forming member having the labyrinth channel internally; and
the second barrier wall is supported by an internal circumferential portion of the channel forming member through a plurality of support parts separated at certain intervals in a circumferential direction.

13. The in-vehicle fuel cell stack according to claim 1, wherein a recess facing the air inlet port is formed in the first barrier wall and is recessed in a direction away from the air inlet port.

14. The in-vehicle fuel cell stack according to claim 1, wherein the air inlet port is opened downward;
a plurality of drain holes are formed around the air inlet port in the inlet member and connect the inner channel and the outside of the inlet member.

15. The in-vehicle fuel cell stack according to claim 14, wherein the plurality of drain holes vertically penetrate a wall of a bottom of a chamber having the labyrinth channel.

16. The in-vehicle fuel cell stack according to claim 14, wherein a ring shaped extension is provided immediately below the plurality of drain holes in a manner to face the plurality of drain holes through a gap.

17. The in-vehicle fuel cell stack according to claim 1, wherein a mesh member is provided at the air inlet port.

* * * * *

UNITED STATES PATENT AND TRADEMARK OFFICE
CERTIFICATE OF CORRECTION

PATENT NO. : 10,777,825 B2
APPLICATION NO. : 15/813275
DATED : September 15, 2020
INVENTOR(S) : Sato Page 1 of 1

It is certified that error appears in the above-identified patent and that said Letters Patent is hereby corrected as shown below:

On the Title Page

In Column 2, in item (56) under 'OTHER PUBLICATIONS':
It should read:
Japanese Office Action for Japanese Patent Application No. 2016-224146 dated Sep. 10, 2019.
Chinese Office Action for Chinese Patent Application No. 201711132218.2 dated June 30, 2020.

Signed and Sealed this
Seventeenth Day of November, 2020

Andrei Iancu
*Director of the United States Patent and Trademark Office*